United States Patent
Huang et al.

(10) Patent No.: US 10,405,255 B2
(45) Date of Patent: *Sep. 3, 2019

(54) DYNAMIC CROSSBAND LINK METHOD AND WIRELESS EXTENDER

(71) Applicant: U-MEDIA Communications, Inc., Hsinchu (TW)

(72) Inventors: Chia-Ching Huang, Penghu County (TW); Yi-Wen Liu, Hsinchu (TW)

(73) Assignee: U-MEDIA Communications, Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/903,045

(22) Filed: Feb. 23, 2018

(65) Prior Publication Data

US 2018/0184354 A1    Jun. 28, 2018

Related U.S. Application Data

(63) Continuation-in-part of application No. 15/072,331, filed on Mar. 16, 2016, now Pat. No. 9,942,827.

(30) Foreign Application Priority Data

Mar. 20, 2015 (TW) .............................. 104109079 A

(51) Int. Cl.
| | |
|---|---|
| H04W 40/14 | (2009.01) |
| H04W 40/06 | (2009.01) |
| H04W 40/16 | (2009.01) |
| H04W 40/38 | (2009.01) |
| H04W 24/08 | (2009.01) |

(52) U.S. Cl.
CPC ........... *H04W 40/14* (2013.01); *H04W 40/06* (2013.01); *H04W 24/08* (2013.01); *H04W 40/16* (2013.01); *H04W 40/38* (2013.01)

(58) Field of Classification Search
CPC ..... H04W 40/06; H04W 40/12; H04W 40/14; H04W 40/16; H04W 40/38; H04W 24/00; H04W 24/08; H04W 24/10; H04W 72/042; H04W 84/047
See application file for complete search history.

(56) References Cited

U.S. PATENT DOCUMENTS

| | | | |
|---|---|---|---|
| 7,299,005 B1 | 11/2007 | Yarkosky | |
| 9,509,480 B2 | 11/2016 | Wild | |
| 2007/0237094 A1 | 10/2007 | Bi | |
| 2013/0100865 A1 | 4/2013 | Baghel | |
| 2015/0071239 A1 | 3/2015 | Zhang | |
| 2015/0229456 A1 | 8/2015 | Wild | |

FOREIGN PATENT DOCUMENTS

WO    2012/010017 A1    1/2012

*Primary Examiner* — Peter Chen
(74) *Attorney, Agent, or Firm* — Winston Hsu

(57) ABSTRACT

A dynamic crossband link method is provided, which includes utilizing a local forwarding module to transmit and receive packet data to and from a client device via a first frequency band; obtaining a plurality of communication quality indicators corresponding to a plurality of uplink forwarding modules; and determining to transmit the packet data to a wireless access device and receive the packet data from the wireless access device via one of the plurality of uplink forwarding modules according to the plurality of communication quality indicators.

22 Claims, 4 Drawing Sheets

DYNAMIC CROSSBAND LINK METHOD AND WIRELESS EXTENDER

CROSS REFERENCE TO RELATED APPLICATIONS

This is a continuation-in-part application of U.S. patent application Ser. No. 15/072,331 (now issued as U.S. Pat. No. 9,942,827, issued on Apr. 10, 2018), which is filed on Mar. 16, 2016 and entitled "DYNAMIC CROSSBAND LINK METHOD AND WIRELESS EXTENDER".

BACKGROUND OF THE INVENTION

1. Field of the Invention

The present invention relates to a dynamic crossband link method and wireless extender, and more particularly, to a dynamic crossband link method capable of dynamically adjusting data uplink path, and a wireless extender thereof.

2. Description of the Prior Art

With the rapid advancement of wireless network technologies and the convenience and portability of wireless networks, there is a growing demand wireless communication network applications. Generally, in a wireless communication network, environmental effects cause wireless signals to suffer unknown phase shift and amplitude attenuation during transmission, thus resulting in interference in signals received by a receiving terminal and signal distortion and affecting signal transmission efficiency. As such, for extending the area of coverage of an existing wireless communication network, a wireless extender or a wireless repeater is used and placed between a wireless access device and a client device for forwarding packet data.

On the other hand, a multiband wireless extender may allow data to be transmitted over multiple frequency bands for providing a wide range of transmission. However, the conventional multiband wireless extender usually transmits packet data using respective frequency band independently. In more detail, the conventional multiband wireless extender receives packet data from the client device via a first frequency band and transmits the received packet data to the wireless access device via the first frequency. Similarly, the conventional multiband wireless extender receives packet data from the client device via a second frequency band and transmits the received packet data to the wireless access device via the second frequency. As such, since the conventional multiband extender receives the packet data from the client device using a specific frequency band, the conventional multiband extender is unable to transmit packet data to the external wireless access device over the same frequency band, thus reducing the transmission efficiency.

SUMMARY OF THE INVENTION

It is therefore an objective of the present invention to provide a dynamic crossband link method and a wireless extender capable of dynamically adjusting data uplink path, to solve the problems in the prior art.

The present invention discloses a dynamic crossband link method, comprising: utilizing a local forwarding module to transmit and receive packet data to and from a client device via a first frequency band; obtaining a plurality of communication quality indicators corresponding to a plurality of uplink forwarding modules; and determining to transmit the packet data to a wireless access device and receive the packet data from the wireless access device via one of the plurality of uplink forwarding modules according to the plurality of communication quality indicators.

The present invention further discloses a wireless extender, applied between a wireless access device and a client device, comprising: a local forwarding module, for transmit and receiving packet data to and from the client device via a first frequency band; a plurality of uplink forwarding modules, for communicating with the wireless access device; and a connection path selection module, comprising: a processing unit, for obtaining a plurality of communication quality indicators corresponding to a plurality of uplink forwarding modules; and a determination unit, for determining to transmit the packet data to the wireless access device or receive the packet data from the wireless access device via one of the plurality of uplink forwarding modules according to the plurality of communication quality indicators.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
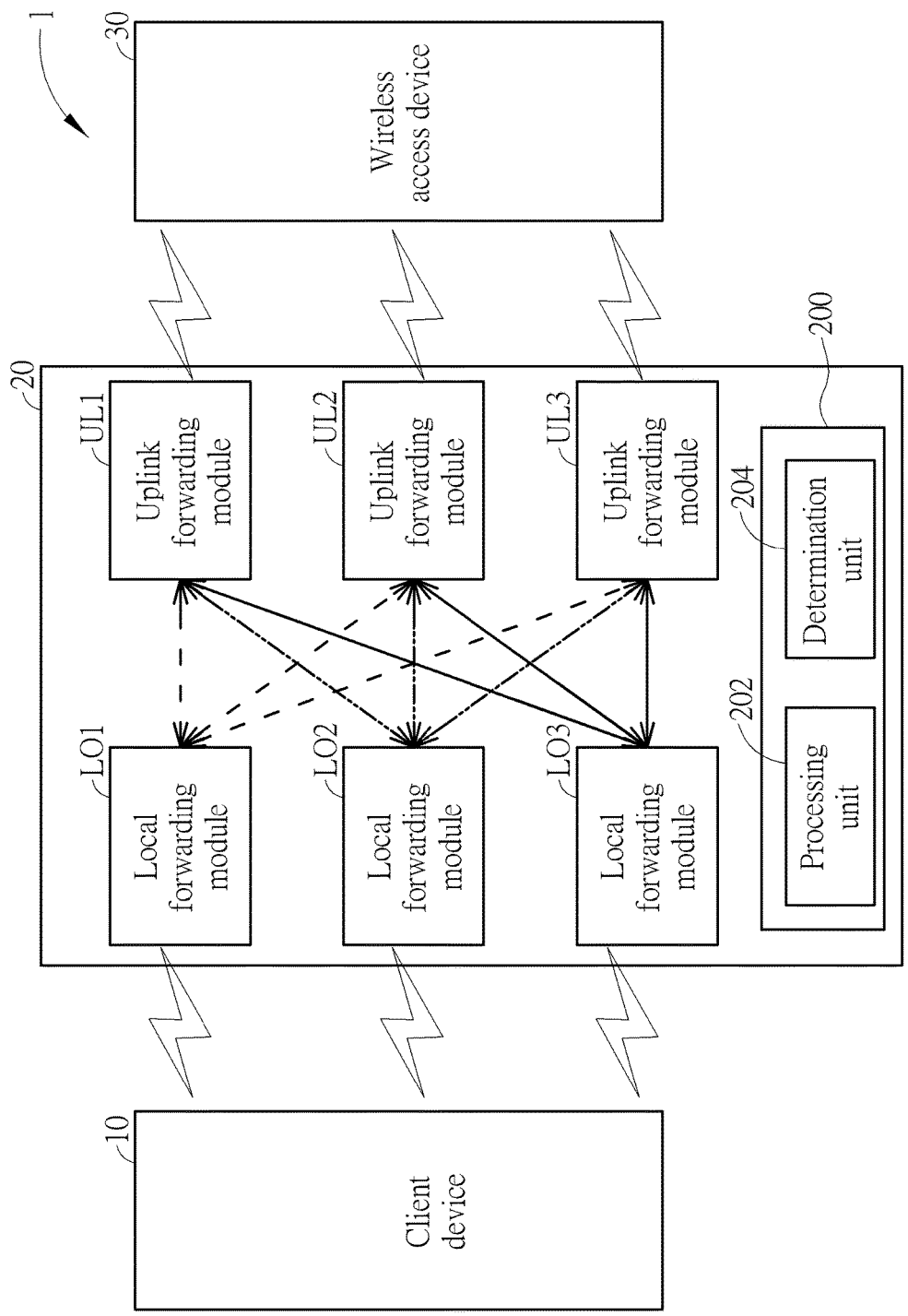
FIG. 1 is a schematic diagram of a communication system according to an embodiment of the present invention.

Please refer to FIG. 1, which is a schematic diagram of a communication system 1 according to an embodiment of the present invention. The communication system 1 includes a client device 10, a wireless extender 20 and a wireless access device 30. The wireless extender 20 is applied between the client device 10 and the wireless access device 30 for forwarding data packets. The wireless access device 30 is utilized for connecting to another network. The wireless access device 30 may include, but is not limited to, a wireless router or a wireless access point (AP). Moreover, the wireless extender 20 includes a connection path selection module 200, local forwarding modules LO1, LO2 and LO3, and uplink forwarding modules UL1, UL2 and UL3. The local forwarding module LO1 is utilized for communicating with the client device 10 via a frequency band f1. The local forwarding module LO2 is utilized for communicating with the client device 10 via a frequency band f2. The local forwarding module LO3 is utilized for communicating with the client device 10 via a frequency band f3. The frequency bands f1, f2 and f3 may be different. The uplink forwarding module UL1 is utilized for communicating with the wireless access device 30 via the frequency band f1. The uplink forwarding module UL2 is utilized for communicating with the wireless access device 30 via the frequency band f2. The frequency band f2 may be different from the frequency bands f1 and f3. The uplink forwarding module UL3 is utilized for communicating with the wireless access device 30 via a frequency band f3. The frequency band f3 may be different from the frequency bands f1 and f2. The connection path selection module 200 includes a processing unit 202 and a determination unit 204. The processing unit 202 is utilized for obtaining a first communication quality indicator corresponding to the uplink forwarding module UL1, a second communication quality indicator corresponding to the uplink forwarding module UL2 and a third communication quality indicator corresponding to the uplink forwarding module UL3. The determination unit 204 is utilized for determining to transmit the packet data received from the client device 10 to the wireless access device 30 and receive the packet data from the wireless access device 30 via the uplink forwarding module UL1, via the uplink forwarding module UL2 or the uplink forwarding module UL3 according to the first communication quality indicator, the second communication quality indicator and the third communication quality indicator. In other words, the connection path selection module 200 of the wireless extender 20 can dynamically adjust transmission paths for transmitting the received packet data to the wireless access device 30 and receiving packet data from the wireless access device 30 for forwarding to the client device 10 according to communication quality indicators, thereby improving the transmission efficiency.

Figure 2:
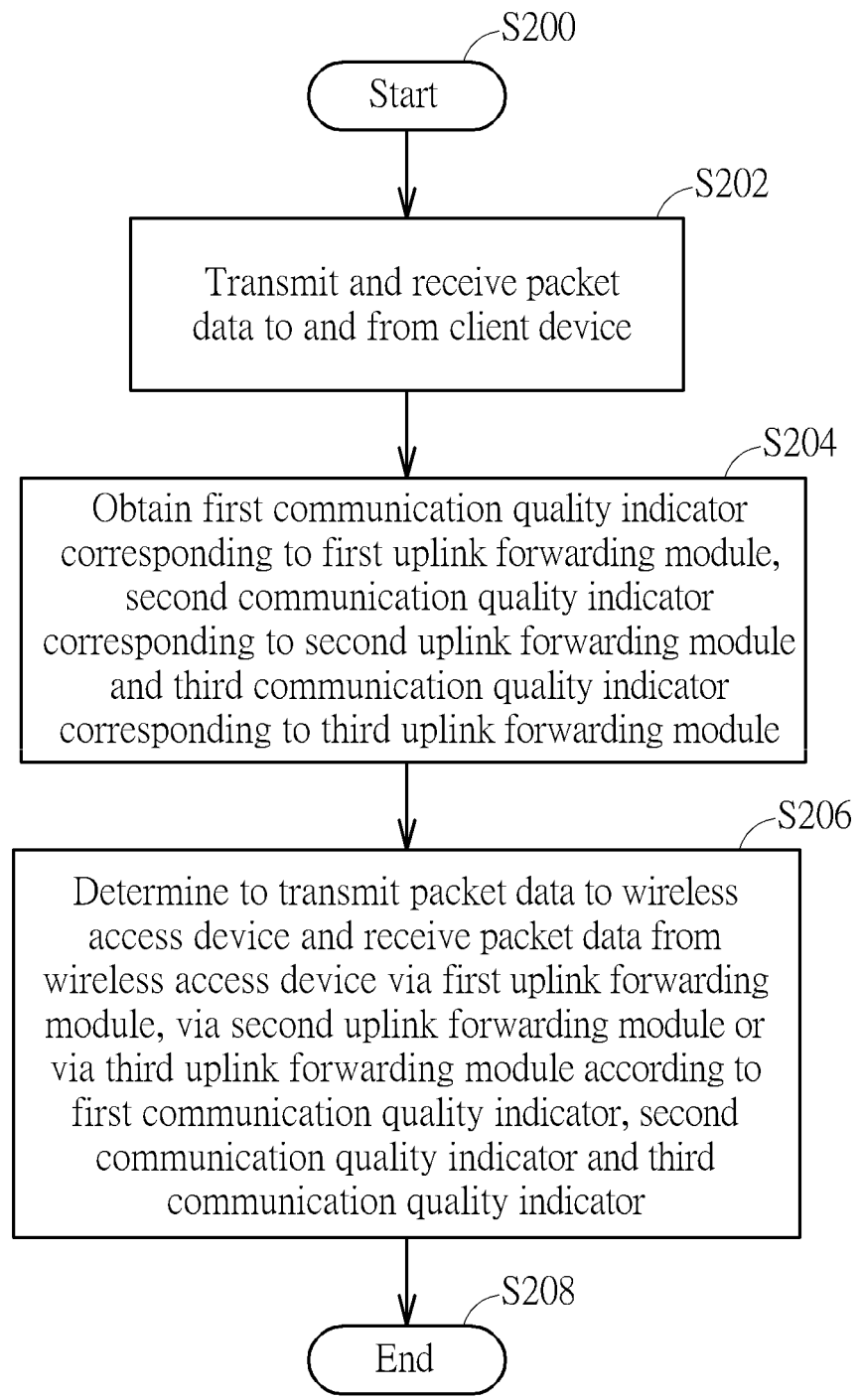
FIG. 2 is a flow diagram of a procedure according to an embodiment of the present invention.

For an illustration of the operations of selecting connection paths of the wireless extender 20, please refer to FIG. 2. FIG. 2 is a flow diagram of a procedure 20 according to an embodiment of the present invention. The flowchart in FIG. 2 mainly corresponds to the operations on the wireless extender 20 shown in FIG. 1. The procedure 20 includes the following steps:

Step S200: Start.

Step S202: Transmit and receive packet data to and from client device.

Step S204: Obtain first communication quality indicator corresponding to first uplink forwarding module, second communication quality indicator corresponding to second uplink forwarding module and third communication quality indicator corresponding to third uplink forwarding module.

Step S206: Determine to transmit packet data to wireless access device and receive packet data from wireless access device via first uplink forwarding module, via second uplink forwarding module or third uplink forwarding module according to first communication quality indicator, second communication quality indicator and third communication quality indicator.

Step S208: End.

According to the procedure 20, the wireless extender 20 of the invention can provide packet forwarding functions in the communication system 1. In the wireless extender 20, the local forwarding modules LO1, LO2 and LO3 can be utilized to transmit and receive packet data to and from the client device 10. The uplink forwarding modules UL1, UL2 and UL3 can be utilized to transmit the received packet data to the wireless access device 30 and receive packet data from the wireless access device 30 for the client device 10. In more detail, the wireless extender 20 can dynamically adjust uplink transmission paths for transmitting the received packet data to the wireless access device 30 and receiving packet data from the wireless access device 30 for forwarding to the client device 10 according to related communication quality indicators so as to improve the transmission efficiency.

In Step S202, one of the local forwarding modules LO1, LO2 and LO3 transmits and receives packet data to and from the client device 10.

In Step S204, the processing unit 202 obtains a first communication quality indicator corresponding to the uplink forwarding module UL1, a second communication quality indicator corresponding to the uplink forwarding module UL2 and a third communication quality indicator corresponding to the uplink forwarding module UL3. The first communication quality indicator, the second communication quality indicator and the third communication quality indicator may respectively include at least one of a data rate, a packet error rate (PER), a wireless link quality, received signal strength indication (RSSI), a resend rate, transmit queued time and a signal to noise ratio (SNR), and this should not be a limitation of the present invention.

In Step S206, the determination unit 204 determines that the uplink forwarding module UL1, the uplink forwarding module UL2 or the uplink forwarding module UL3 transmits the received packet data to the wireless access device 30 and receives packet data from wireless access device 30 according to the first communication quality indicator, the second communication quality indicator and the third communication quality indicator. In other words, the invention can dynamically choose the best uplink transmission path for transmitting the received packet data to the wireless access device 30 and receiving the packet data from the wireless access device 30 for the client device 10 according to related communication quality indicators, thus improving the transmission efficiency.

In an embodiment, the processing unit 202 obtains a first data rate corresponding to the uplink forwarding module UL1, a second data rate corresponding to the uplink forwarding module UL2 and a third data rate corresponding to the uplink forwarding module UL3. The first data rate is the data rate between the uplink forwarding module UL1 and the wireless access device 30. The second data rate is the data rate between the uplink forwarding module UL2 and the wireless access device 30. The third data rate is the data rate between the uplink forwarding module UL3 and the wireless access device 30. Moreover, the determination unit 204 can determine that the uplink forwarding module UL1, the uplink forwarding module UL2 or the uplink forwarding module UL3 transmits the packet data received from the client device 10 to the wireless access device 30 according to the first data rate, the second data rate and the third data rate. For example, when the first data rate is greater than a threshold value, the determination unit 204 may determine that the uplink forwarding module UL1 transmits the packet data received from the client device 10 to the wireless access device 30 and receives the packet data from the wireless access device 30 for forwarding to the client device 10. When the first data rate is smaller than or equal to the threshold value, the determination unit 204 may determine that the uplink forwarding module UL2 transmits the packet data received from the client device 10 to the wireless access device 30 and receives the packet data from the wireless access device 30 for forwarding to the client device 10. In other words, the invention can dynamically choose the best uplink transmission path for transmitting the received packet data to the wireless access device 30 according to related communication quality indicators, thus improving the transmission efficiency.

In an embodiment, when the local forwarding module LO1 receives packet data from the client device 10 via the frequency band f1 (e.g. Step S202). The processing unit 202 obtains a first data rate and a first packet error rate corresponding to the uplink forwarding module UL1, obtains a second data rate and a second packet error rate corresponding to the uplink forwarding module UL2 and obtains a third data rate and a third packet error rate corresponding to the uplink forwarding module UL3. Further, the processing unit 202 obtains a first local data rate and a first local packet error rate corresponding to the local forwarding module LO1 (e.g. Step S204). The first data rate and the first packet error rate are respectively the data rate and the packet error rate between the uplink forwarding module UL1 and the wireless access device 30. The second data rate and the second packet error rate are respectively the data rate and the packet error rate between the uplink forwarding module UL2 and the wireless access device 30. The third data rate and the third packet error rate are respectively the data rate and the packet error rate between the uplink forwarding module UL3 and the wireless access device 30. The first local data rate and the first local packet error rate are respectively the data rate and the packet error rate between the local forwarding module LO1 and the client device 10.

Moreover, regarding the packet data received by the local forwarding module LO1 via the frequency band f1, the processing unit 202 calculates a straight throughput and a crossband throughput associated with the local forwarding module LO1 according to related communication quality indicators obtained at Step S204 for the following transmission path selection (e.g. Step S206). In more detail, since the local forwarding module LO1 receives packet data from the client device 10, and the uplink forwarding module UL1 and the local forwarding module LO1 both operate at the frequency band f1 (i.e. the uplink forwarding module UL1 operates in the same frequency band utilized by the local forwarding module LO1 for communication with the client device), the processing unit 202 can calculate the straight throughput according to the first data rate corresponding to the uplink forwarding module UL1 and the first local data rate corresponding to the local forwarding module LO1.

Since the local forwarding module LO1 operates at the frequency band f1 and the uplink forwarding module UL2 operates at the frequency band f2 (i.e. the local forwarding module LO1 and the uplink forwarding module UL2 operate in different frequency bands), the processing unit 202 can calculate the crossband throughput according to the second data rate corresponding to the uplink forwarding module UL2 and the first local data rate corresponding to the local forwarding module LO1. Since the local forwarding module LO1 operates at the frequency band f1 and the uplink forwarding module UL3 operates at the frequency band f3 (i.e. the local forwarding module LO1 and the uplink forwarding module UL3 operate in different frequency bands), the processing unit 202 can calculate the crossband throughput according to the third data rate corresponding to the uplink forwarding module UL3 and the first local data rate corresponding to the local forwarding module LO1. That is, when the wireless extender 20 includes at least one uplink forwarding module that communicates with the wireless access device 30 via a frequency band different from a frequency band utilized by the local forwarding module LO1. For each uplink forwarding module that using a different frequency band (different from the local forwarding module LO1), the processing unit 202 can calculate a respective crossband throughput according to a respective data rate corresponding to the each uplink forwarding module and the first local data rate corresponding to the local forwarding module LO1.

The following further elaborates the embodiments of calculating the straight throughput and the crossband throughput. For example, the processing unit 202 calculates a first uplink throughput according to the first data rate and the first packet error rate corresponding to the uplink forwarding module UL1. The processing unit 202 calculates a second uplink throughput according to the second data rate and the second packet error rate corresponding to the uplink forwarding module UL2. The processing unit 202 calculates a third uplink throughput according to the third data rate and the third packet error rate corresponding to the uplink forwarding module UL3. The processing unit 202 calculates a first local throughput according to the first local data rate and the first local packet error rate corresponding to the local forwarding module LO1. The processing unit 202 calculates a second local throughput according to the second local data rate and the second local packet error rate corresponding to the local forwarding module LO2. The processing unit 202 calculates a third local throughput according to the third local data rate and the third local packet error rate corresponding to the local forwarding module LO3. The first uplink throughput, the second uplink throughput, the third uplink throughput, the first local throughput, the second local throughput and the third local throughput may be calculated by the processing unit 202 according to the following equations:

$$TP_i = R_i \times (1-\text{PER}_i);$$

$$TP_{loj} = R_{loj} \times (1-\text{PER}_{loj}) \quad (1)$$

where i=1, 2 and 3; j=1, 2 and 3; $TP_1$, $R_1$, $\text{PER}_1$ represent, respectively, the first uplink throughput, the first data rate and the first packet error rate corresponding to the uplink forwarding module UL1; $TP_2$, $R_2$, $\text{PER}_2$ represent, respectively, the second uplink throughput, the second data rate and the second packet error rate corresponding to the uplink forwarding module UL2; $TP_3$, $R_3$, $\text{PER}_3$ represent, respectively, the third uplink throughput, the third data rate and the third packet error rate corresponding to the uplink forwarding module UL3; $TP_{lo1}$, $R_{lo1}$, $\text{PER}_{lo1}$ represent, respectively, the first local throughput, the first local data rate and the first local packet error rate corresponding to the local forwarding module LO1; $TP_{lo2}$, $R_{lo2}$, $\text{PER}_{lo2}$ represent, respectively, the second local throughput, the second local data rate and the second local packet error rate corresponding to the local forwarding module LO2; and $TP_{lo3}$, $R_{lo3}$, $\text{PER}_{lo3}$ represent, respectively, the third local throughput, the third local data rate and the third local packet error rate corresponding to the local forwarding module LO3.

Since the local forwarding module LO1 receives packet data from the client device 10, and the uplink forwarding module UL1 and the local forwarding module LO1 operate at the frequency band f1, the processing unit 202 can calculate the straight throughput according to the first uplink throughput and the first local throughput. The straight throughput for the wireless client 10 may be calculated by the processing unit 202 according to the following equation:

$$TP\_S = TP_1 \times TP_{lo1} / (TP_1 + TP_{lo1}) \quad (2)$$

where TP_S represents the straight throughput for the wireless client 10, $TP_1$ represents the first uplink throughput corresponding to the uplink forwarding module UL1, and $TP_{lo1}$ represents the first local throughput corresponding to the local forwarding module LO1.

Since the local forwarding module LO1 receives packet data from the client device 10, and the uplink forwarding module UL2 and the local forwarding module LO1 operate at different frequency bands, the processing unit 202 can calculate the crossband throughput corresponding to the client device 10 according to the second uplink throughput and the first local throughput. The processing unit 202 compares the second uplink throughput with the first local throughput and selects a minimum of the second uplink throughput and the local throughput as the crossband throughput corresponding to the client device 10. The crossband throughput corresponding to the client device 10 may be calculated by the processing unit 202 according to the following equation:

$$TP\_C1 = \min(TP_2, TP_{lo1}) \quad (3)$$

where TP_C1 represents the crossband throughput corresponding to the uplink forwarding module UL2 and the local forwarding module LO1 for the client device 10, $TP_2$ represents the second uplink throughput corresponding to the uplink forwarding module UL2, and $TP_{lo1}$ represents the first local throughput corresponding to the local forwarding module LO1.

Similarly, since the local forwarding module LO1 receives packet data from the client device 10, and the uplink forwarding module UL3 and the local forwarding module LO1 operate at different frequency bands, the processing unit 202 can calculate the crossband throughput corresponding to the client device 10 according to the third uplink throughput and the first local throughput. The processing unit 202 compares the third uplink throughput with the first local throughput and selects a minimum of the third uplink throughput and the local throughput as the crossband throughput corresponding to the uplink forwarding module UL3 and the local forwarding module LO1 for the client device 10. The crossband throughput corresponding to the client device 10 may be calculated by the processing unit 202 according to the following equation:

$$TP\_C2 = \min(TP_3, TP_{lo1}) \quad (4)$$

where TP_C2 represents the crossband throughput corresponding to the uplink forwarding module UL3 and the local forwarding module LO1 for the client device 10, $TP_3$ represents the third uplink throughput corresponding to the uplink forwarding module UL3, and $TP_{lo1}$ represents the first local throughput corresponding to the local forwarding module LO1.

Moreover, after straight throughput TP_S and the crossband throughputs TP_C1 and TP_C2 corresponding to the wireless client 10 are calculated by the processing unit 202, the determination unit 204 can determine that the packet data is transmitted to the wireless access device 30 via the uplink forwarding module UL1, via the uplink forwarding module UL2 or via the uplink forwarding module UL3 according to the straight throughput and the crossband throughputs. For example, the processing unit 202 compares the calculated straight throughput with the calculated crossband throughputs. The processing unit 202 may select a maximum throughput from the straight throughput TP_S and the crossband throughputs TP_C1 and TP_C2, and determines that the uplink forwarding module having the maximum throughput as a selected uplink forwarding module for following forwarding operation. When the straight throughput TP_S is greater than the crossband throughputs TP_C1 and TP_C2, the determination unit 204 determines that the packet data is transmitted to the wireless access device 30 via the uplink forwarding module UL1 (i.e. straight forwarding mode). In such a situation, the local forwarding module LO1 can receive packet data from the client device 10 via the frequency band f1 and transmit the received packet data to the uplink forwarding module UL1. Furthermore, the uplink forwarding module UL1 can transmit the packet data to the wireless access device 30 via the frequency band f1. In addition, the uplink forwarding module UL1 can receive packet data from the wireless access device 30 via the frequency band f1.

When the crossband throughput TP_C1 is greater than the crossband throughput TP_C2 and the straight throughput TP_S, the determination unit 204 determines that the packet data is transmitted to the wireless access device 30 via the uplink forwarding module UL2 (i.e. crossband forwarding mode). In such a situation, the local forwarding module LO1 can receive packet data from the client device 10 via the frequency band f1 and transmit the received packet data to the uplink forwarding module UL2, such that the uplink forwarding module UL2 transmits the packet data to the wireless access device 30 via the frequency band f2. In addition, the uplink forwarding module UL2 can receive packet data from the wireless access device 30 via the frequency band f2. Therefore, when the uplink forwarding module UL1 operating at the frequency band f1 has a poor connection quality and is not suitable for transmitting data, the wireless extender 20 can adjust the transmission path to the uplink forwarding module UL2, so as to avoid unusable transmission paths, avoid transmitting in congested frequency band, increase the spectrum utilization efficiency and improve the transmission efficiency.

When the crossband throughput TP_C2 is greater than the crossband throughput TP_C1 and the straight throughput TP_S, the determination unit 204 determines that the packet data is transmitted to the wireless access device 30 via the uplink forwarding module UL3 (i.e. crossband forwarding mode). In such a situation, the local forwarding module LO1 can receive packet data from the client device 10 via the frequency band f1 and transmit the received packet data to the uplink forwarding module UL3, such that the uplink forwarding module UL3 transmits the packet data to the wireless access device 30 via the frequency band f3. In addition, the uplink forwarding module UL3 can receive packet data from the wireless access device 30 via the frequency band f3. Therefore, when the uplink forwarding module UL1 operating at the frequency band f1 has a poor connection quality and is not suitable for transmitting data, the wireless extender 20 can adjust the transmission path to the uplink forwarding module UL3, so as to avoid unusable transmission paths, avoid transmitting in congested frequency band, increase the spectrum utilization efficiency and improve the transmission efficiency.

In brief, when the wireless extender 20 includes a plurality of uplink forwarding modules, the processing unit 202 calculates and compares the corresponding straight throughput and the corresponding crossband throughputs. The processing unit 202 selects a maximum throughput from the calculated straight throughput and the calculated crossband throughputs and determines an uplink forwarding module having the maximum throughput as a selected uplink forwarding module. Accordingly, the determination unit 204 determines to transmit the packet data received from the client device and receive the packet data from the wireless access device for the client device via the selected uplink forwarding module. For the packet data transmitted to or received from the client device 10 via the frequency band f1 by the local forwarding module LO1, the connection path selection module 200 dynamically determines that the packet data is transmitted to the wireless access device 30 or is received from the wireless access device 30 for the client device 10 via the uplink forwarding module UL1 operating at the frequency band f1 (i.e. straight forwarding mode), via the uplink forwarding module UL2 operating at the frequency band f2 (i.e. crossband forwarding mode) or via the uplink forwarding module UL3 operating at the frequency band f3 (i.e. crossband forwarding mode) according to related communication quality indicators. Therefore, the wireless extender of the invention can dynamically and immediately adjust transmission paths for transmitting the received packet data to the wireless access device and receiving packet data from the wireless access device for the client device, thus effectively improving the transmission efficiency.

Figure 3:
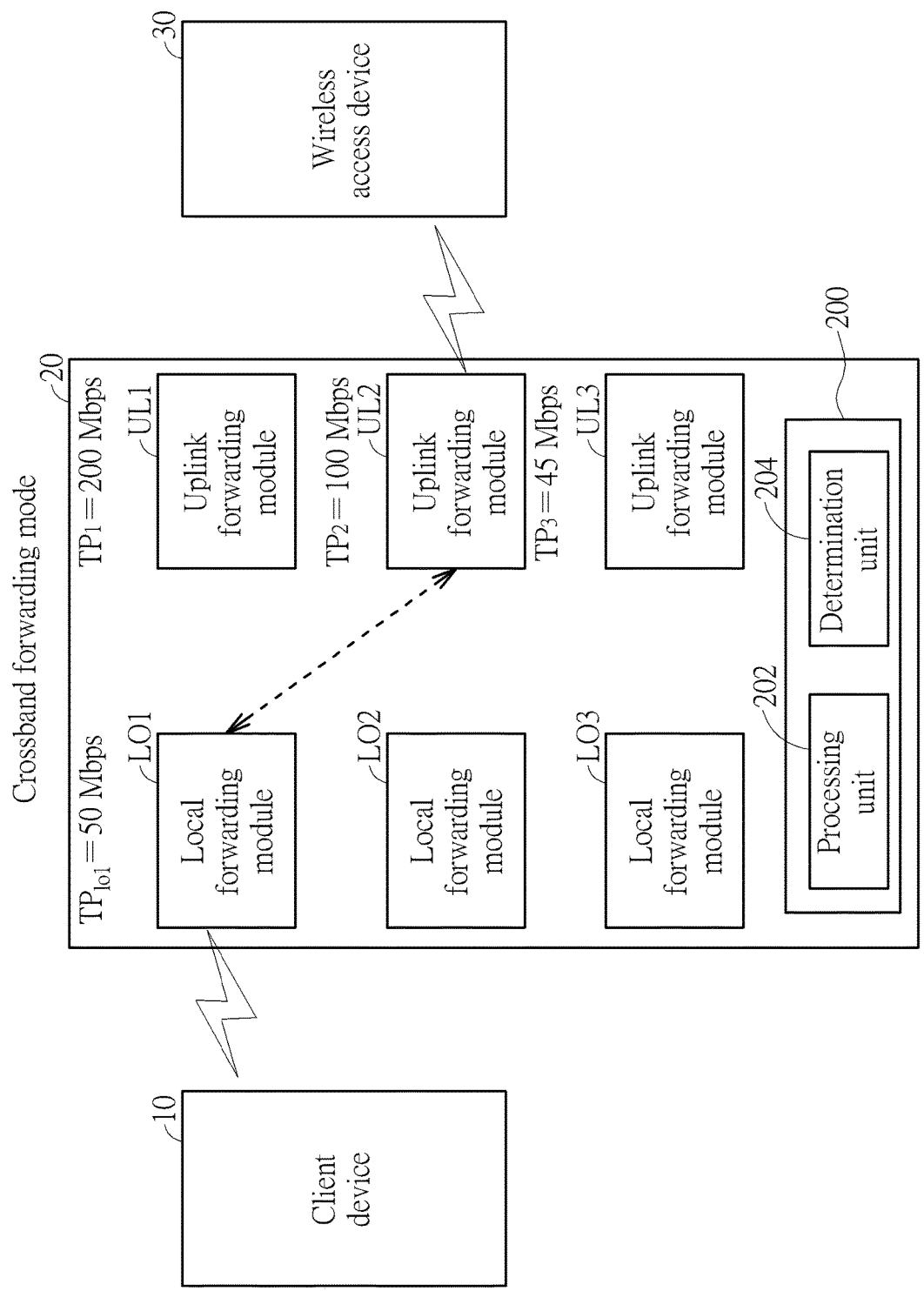
FIG. 3 and FIG. 4 are schematic diagrams of selecting connection path according to embodiments of the present invention respectively.

The following further elaborates embodiments associated with the operation of the communication system 1 shown in FIG. 1. In an embodiment, please refer to FIG. 3. Assuming the local forwarding module LO1 and the uplink forwarding module UL1 operate at a frequency band of 5 GHz. The local forwarding module LO2 and the uplink forwarding module UL2 operate at a frequency band of 2.4 GHz. The local forwarding module LO3 and the uplink forwarding module UL3 operate at a frequency band of 5.8 GHz. According to equation (1), the calculated first uplink throughput $TP_1$ corresponding to the uplink forwarding module UL1 is 200 Mbps. The calculated second uplink throughput $TP_2$ corresponding to the uplink forwarding module UL2 is 100 Mbps. The calculated third uplink throughput $TP_3$ corresponding to the uplink forwarding module UL3 is 45 Mbps. The calculated first local throughput $TP_{lo1}$ corresponding to the local forwarding module LO1 is 50 Mbps. Moreover, according to equation (2), the straight throughput TP_S corresponding to the client device 10 would be:

$$TP\_S = 200 \text{ Mbps} \times 50 \text{ Mbps}/(200 \text{ Mbps} + 50 \text{ Mbps})$$
$$= 40 \text{ Mbps}$$

According to equations (3) and (4), the crossband throughputs TP_C1 and TP_C2 corresponding to the client device 10 would be:

$$TP\_C1 = \min(50 \text{ Mbps}, 100 \text{ Mbps}) = 50 \text{ Mbps};$$

$$TP\_C2 = \min(50 \text{ Mbps}, 45 \text{ Mbps}) = 45 \text{ Mbps}$$

In such a situation, the maximum throughput is the crossband throughput TP_C1 (i.e. TP_C1=50 Mbps>TP_C2=45 Mbps>TP_S=40 Mbps), the determination unit 204 may adopt the crossband forwarding mode and determine that the uplink forwarding module UL2 transmits the packet data received from the client device 10 to the wireless access device 30 and receives the packet data from the wireless access device 30 for the client device 10. Accordingly, after receiving packet data from the client device 10 via the frequency band f1, the local forwarding module LO1 transmits the received packet data to the uplink forwarding module UL2. The uplink forwarding module UL2 transmits the packet data to the wireless access device 30 via the frequency band f2.

Figure 4:
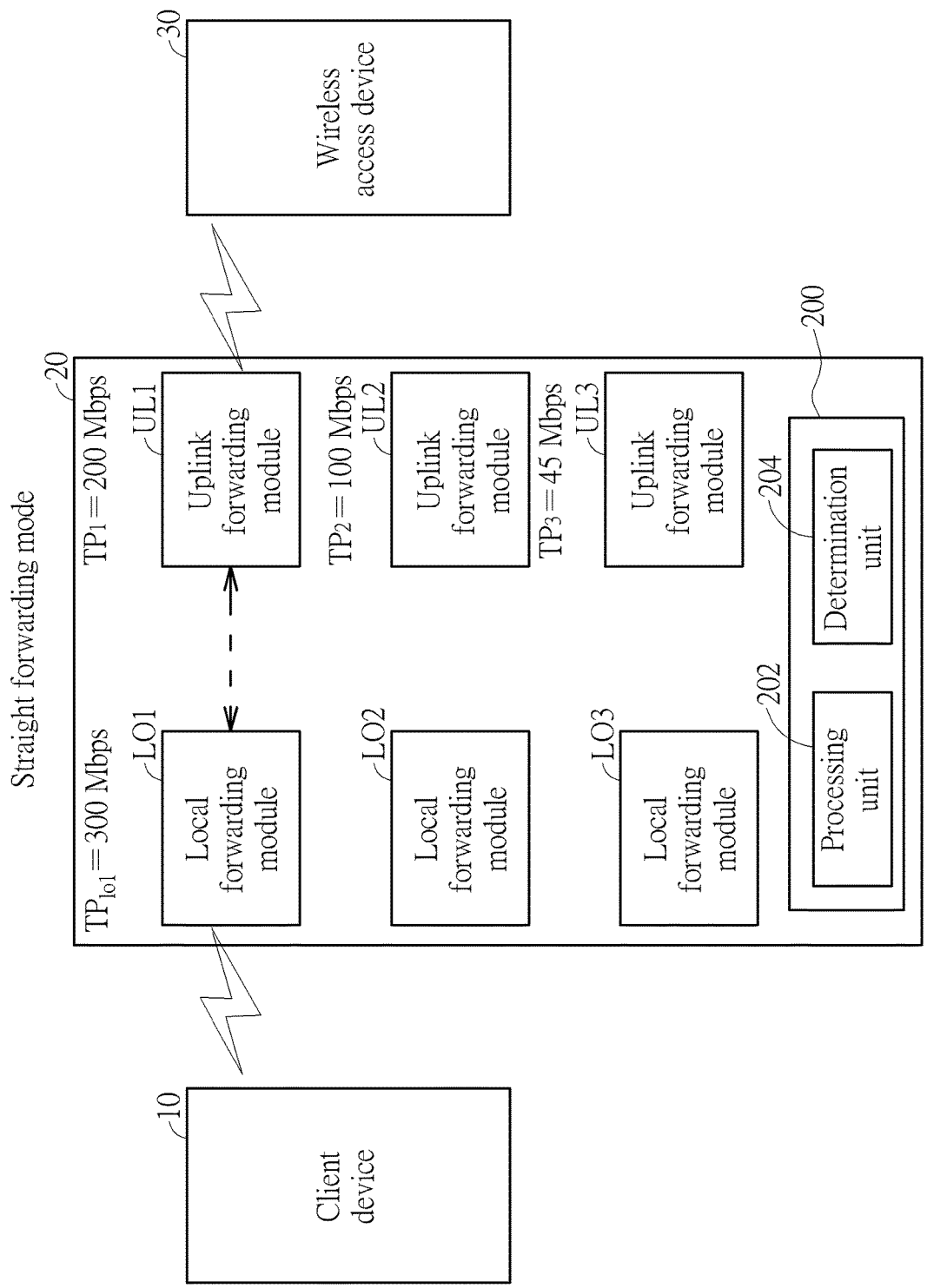

In an embodiment, please refer to FIG. 4. Assuming the local forwarding module LO1 and the uplink forwarding module UL1 operate at a frequency band of 5 GHz. The local forwarding module LO2 and the uplink forwarding module UL2 operate at a frequency band of 2.4 GHz. The local forwarding module LO3 and the uplink forwarding module UL3 operate at a frequency band of 5.8 GHz. According to equation (1), the calculated first uplink throughput $TP_1$ corresponding to the uplink forwarding module UL1 is 200 Mbps. The calculated second uplink throughput $TP_2$ corresponding to the uplink forwarding module UL2 is 100 Mbps. The calculated second uplink throughput $TP_3$ corresponding to the uplink forwarding module UL3 is 45 Mbps. The calculated first local throughput $TP_{lo1}$ corresponding to the local forwarding module LO1 is 300 Mbps. Moreover, according to equation (2), the straight throughput TP_S corresponding to the client device 10 would be:

$$TP\_S = 200 \text{ Mbps} \times 300 \text{ Mbps}/(200 \text{ Mbps} + 300 \text{ Mbps})$$
$$= 120 \text{ Mbps}$$

According to equations (3) and (4), the crossband throughputs TP_C1 and TP_C2 corresponding to the client device 10 would be:

$$TP\_C1 = \min(300 \text{ Mbps}, 100 \text{ Mbps}) = 100 \text{ Mbps};$$

$$TP\_C2 = \min(300 \text{ Mbps}, 45 \text{ Mbps}) = 45 \text{ Mbps}$$

In such a situation, the straight throughput TP_S is greater than the crossband throughputs TP_C1 and TP_C2 (i.e. TP_S=120 Mbps>TP_C1=100 Mbps>TP_C2=45 Mbps), the maximum throughput is the straight throughput TP_S. The determination unit 204 may adopt the straight forwarding mode and determine that the uplink forwarding module UL1 transmits the packet data received from the client device 10 to the wireless access device 30 and receives the packet data from the wireless access device 30 for the client device 10. Accordingly, after receiving packet data from the client device 10 via the frequency band f1, the local forwarding module LO1 transmits the received packet data to the uplink forwarding module UL1. The uplink forwarding module UL1 transmits the packet data to the wireless access device 30 via the frequency band f1.

Please note that, the communication system 1 is an exemplary embodiment of the present invention, and those skilled in the art can make alternations and modifications accordingly. For example, the number of the local forwarding modules and the number of the uplink forwarding modules included in the wireless extender 20 are not limited, and may be varied and designed according to practical system demands. The abovementioned first data rate may include a first data transmission rate or a first data reception rate. The abovementioned second data rate may include a second data transmission rate or a second data reception rate. The abovementioned third data rate may include a third data transmission rate or a third data reception rate. The abovementioned first local data rate may include a first local data transmission rate or a first local data reception rate. The abovementioned first packet error rate may include a first transmission packet error rate or a first reception packet error rate. The abovementioned second packet error rate may include a second transmission packet error rate or a second reception packet error rate. The abovementioned first local packet error rate may include a first local transmission packet error rate or a first local reception packet error rate. In addition, the wireless extender 20 further includes a memory, the processing unit 202 is coupled to the memory. The memory stores the uplink forwarding modules UL1, and UL2 and UL3, the local forwarding modules LO1, LO2 and LO3, and the connection path selection module 200.

In summary, for the packet data transmitted to or received from the client device 10 via the frequency band f1 by the local forwarding module LO1, the invention can dynamically determine that the packet data is transmitted to or received from the wireless access device via the uplink forwarding module operating at the frequency band f1 (i.e. straight forwarding mode) or via the uplink forwarding module operating at a frequency band different from the frequency band f1 (i.e. crossband forwarding mode) according to related communication quality indicators. Therefore, the invention can dynamically and immediately adjust transmission paths for transmitting the received packet data to the wireless access device and receiving packet data from the wireless access device, thus effectively improving the transmission efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dynamic crossband link method performed by a wireless extender, comprising:
   utilizing a local forwarding module to transmit and receive packet data to and from a client device via a first frequency band;
   obtaining a plurality of communication quality indicators corresponding to a plurality of uplink forwarding modules and a local communication quality indicator corresponding to the local forwarding module;
   calculating a straight throughput according to a first communication quality indicator corresponding to a first uplink forwarding module of the plurality of uplink forwarding modules and the local communication quality indicator corresponding to the local forwarding module;
   calculating at least one crossband throughput according to at least one second communication quality indicator corresponding to at least one second uplink forwarding module of the plurality of uplink forwarding modules;
   determining to transmit the packet data to a wireless access device and receive the packet data from the wireless access device via one of the plurality of uplink forwarding modules according to the straight throughput and the at least one crossband throughput; and
   transmitting and receiving, by the wireless extender via the one of the plurality of uplink forwarding modules, the packet data to and from the wireless access device.

2. The method of claim 1, wherein the first uplink forwarding module of the plurality of uplink forwarding modules communicates with the wireless access device via the first frequency band, wherein the first frequency band is the frequency band that is utilized by the local forwarding module for communication with the client device and the at least one second uplink forwarding module of the plurality of uplink forwarding modules communicates with the wireless access device via at least one second frequency band different from the first frequency band.

3. The method of claim 2, wherein the step of determining to transmit the packet data to the wireless access device and receive the packet data from the wireless access device via one of the plurality of uplink forwarding modules according to the straight throughput and the at least one crossband throughput comprises:
   calculating the straight throughput according to a first data rate corresponding to the first uplink forwarding module and a local data rate corresponding to the local forwarding module;
   calculating the at least one crossband throughput according to at least one second data rate corresponding to the at least one second uplink forwarding module and the local data rate; and
   determining to transmit the packet data received from the client device to the wireless access device and receive the packet data from the wireless access device for the client device via the first uplink forwarding module or the at least one second uplink forwarding module according to the straight throughput and the at least one crossband throughput;
   wherein the first data rate is the data rate between the first uplink forwarding module and the wireless access device, each second data rate is the data rate between a respective second uplink forwarding module and the wireless access device, and the local data rate is the data rate between the local forwarding module and the client device.

4. The method of claim 3, wherein the step of calculating the straight throughput comprises:
   calculating a first uplink throughput according to the first data rate and a first packet error rate corresponding to the first uplink forwarding module;
   calculating a local throughput according to the local data rate and a local packet error rate corresponding to the local forwarding module; and
   calculating the straight throughput of the first uplink forwarding module according to the first uplink throughput and the local throughput.

5. The method of claim 4, wherein the step of calculating the straight throughput determines the straight throughput according to the following equation:

$$TP\_S = TP_p \times TP_{lo} / (TP_p + TP_{lo})$$

where TP_S represents the straight throughput; $TP_p$ represents the first uplink throughput of the first uplink forwarding module; and $TP_{lo}$ represents the local throughput.

6. The method of claim 4, wherein the first uplink throughput of the first uplink forwarding module and the local throughput are determined according to the following equations:

$$TP_p = R_p \times (1 - PER_p);$$

$$TP_{lo} = R_{lo} \times (1 - PER_{lo})$$

where $TP_p$ represents the first uplink throughput of the first uplink forwarding module; $R_p$ represents the first data rate of the first uplink forwarding module; $PER_p$ represents the first packet error rate; $TP_{lo}$ represents the local throughput; $R_{lo}$ represents the local data rate; and $PER_{lo}$ represents the local error rate.

7. The method of claim 3, wherein the step of calculating the at least one crossband throughput comprises:
   for each second uplink forwarding module, calculating a second uplink throughput according to a respective second data rate and a respective second packet error rate corresponding to the each second uplink forwarding module;
   for each second uplink forwarding module, calculating a local throughput according to the local data rate and a local packet error rate corresponding to the local forwarding module; and
   calculating the crossband throughput of the each second uplink forwarding module according to the second uplink throughput and the local throughput.

8. The method of claim 7, wherein the step of calculating the crossband throughput corresponding to the each second uplink forwarding module according to the second uplink throughput and the local throughput comprises:
   for each second uplink forwarding module, comparing the respective second uplink throughput with the local throughput; and
   for each second uplink forwarding module, selecting a minimum of the respective second uplink throughput and the local throughput as the crossband throughput of the each second uplink forwarding module.

9. The method of claim 7, wherein the second uplink throughput of the at least one second uplink forwarding module is determined according to the following equations:

$TP_q = R_q \times (1-PER_q), q=1,\ldots,N;$ $TP_{lo} = R_{lo} \times (1-PER_{lo})$ where $TP_q$ represents a respective second uplink throughput of q-th second uplink forwarding module; $R_q$ represents a respective second data rate of q-th second uplink forwarding module; $PER_q$ represents a respective second packet error rate of q-th second uplink forwarding module; $TP_{lo}$ represents the local throughput; $R_{lo}$ represents the local data rate; and $PER_{lo}$ represents the local error rate; N and q are positive integers, q is between 1 and N.

10. The method of claim 3, wherein the step of determining to transmit the packet data received from the client device to the wireless access device and receive the packet data from the wireless access device via the first uplink forwarding module or the at least one second uplink forwarding module according to the straight throughput and the at least one crossband throughput comprises:
comparing the straight throughput and the at least one crossband throughput;
selecting a maximum throughput from the straight throughput and the at least one crossband throughput;
determining the first uplink forwarding module having the maximum throughput or a second uplink forwarding module having the maximum throughput as a selected uplink forwarding module; and
determining to transmit the packet data received from the client device to the wireless access and receive the packet data from the wireless access device for the client device via the selected uplink forwarding module.

11. The method of claim 1, wherein one of the communication quality indicators comprises at least one of a data rate, a packet error rate, a wireless link quality, received signal strength indication, a resend rate, transmit queued time, a signal to noise ratio.

12. A wireless extender, applied between a wireless access device and a client device, comprising:
a processor unit coupled to a memory, wherein the memory stores a local forwarding module, a plurality of uplink forwarding modules and a connection path selection module, wherein:
the local forwarding module, for transmit and receive packet data to and from the client device via a first frequency band;
the plurality of uplink forwarding modules, for communicating with the wireless access device; and
the connection path selection module, comprising:
a processing unit, for obtaining a plurality of communication quality indicators corresponding to a plurality of uplink forwarding modules and a local communication quality indicator corresponding to the local forwarding module, calculating a straight throughput according to a first communication quality indicator corresponding to a first uplink forwarding module of the plurality of uplink forwarding modules and the local communication quality indicator corresponding to the local forwarding module and calculating at least one crossband throughput according to at least one second communication quality indicator corresponding to at least one second uplink forwarding module of the plurality of uplink forwarding modules;
a determination unit, for determining to transmit the packet data to the wireless access device or receive the packet data from the wireless access device via one of the plurality of uplink forwarding modules according to the straight throughput and the at least one crossband; and
the wireless extender via the one of the plurality of uplink forwarding modules, for transmitting and receiving the packet data to and from the wireless access device.

13. The wireless extender of claim 12, wherein the first uplink forwarding module of the plurality of uplink forwarding module communicates with the wireless access device via the first frequency band, wherein the first frequency band is the frequency band that utilized by the local forwarding module for communication with the client device and the at least one second uplink forwarding module of the plurality of uplink forwarding modules communicates with the wireless access device via at least one second frequency band different from the first frequency band.

14. The wireless extender of claim 13, wherein the processing unit calculates the straight throughput according to a first data rate corresponding to the first uplink forwarding module and a local data rate corresponding to the local forwarding module, the processing unit calculates the at least one crossband throughput according to at least one second data rate corresponding to the at least one second uplink forwarding module and the local data rate, and the determination unit determines to transmit the packet data received from the client device to the wireless access device and receive the packet data from the wireless access device for the client device via the first uplink forwarding module or via the at least one second uplink forwarding module according to the straight throughput and the at least one crossband throughput, wherein the first data rate is the data rate between the first uplink forwarding module and the wireless access device, each second data rate is the data rate between a respective second uplink forwarding module and the wireless access device, and the local data rate is the data rate between the local forwarding module and the client device.

15. The wireless extender of claim 14, wherein the processing unit calculates a first uplink throughput according to the first data rate and a first packet error rate corresponding to the first uplink forwarding module, calculates a local throughput according to the local data rate and a local packet error rate corresponding to the local forwarding module, and calculates the straight throughput of the first uplink forwarding module according to the first uplink throughput and the local throughput.

16. The wireless extender of claim 15, wherein the straight throughput is calculated by the processing unit according to the following equation:

$TP\_S = TP_p \times TP_{lo}/(TP_p + TP_{lo})$ where $TP\_S$ represents the straight throughput associated of the first uplink forwarding module; $TP_p$ represents the first uplink throughput of the first uplink forwarding module; and $TP_{lo}$ represents the local throughput.

17. The wireless extender of claim 15, wherein the first uplink throughput of the first uplink forwarding module and the local throughput are determined according to the following equations:

$TP_p = R_p \times (1-PER_p);$ $TP_{lo} = R_{lo} \times (1-PER_{lo})$ where $TP_p$ represents the first uplink throughput of the first uplink forwarding module; $R_p$ represents the first data rate of the first uplink forwarding module; $PER_p$ represents the first packet error rate; $TP_{lo}$ represents the local throughput; $R_{lo}$ represents the local data rate; and $PER_{lo}$ represents the local error rate.

18. The wireless extender of claim 14, wherein for each second uplink forwarding module, the processing unit calculates a second uplink throughput according to a respective second data rate and a respective second packet error rate corresponding to the each second uplink forwarding module, calculates a local throughput according to the local data rate and a local packet error rate corresponding to the local forwarding module, and calculates the crossband throughput of the each second uplink forwarding module according to the second uplink throughput and the local throughput.

19. The wireless extender of claim 18, wherein for each second uplink forwarding module, the processing unit compares the second uplink throughput of the each second uplink forwarding module with the local throughput and selects a minimum of the second uplink throughput of the each second uplink forwarding module and the local throughput as the crossband throughput of the each second uplink forwarding module.

20. The wireless extender of claim 18, wherein the second uplink throughput of the at least one second uplink forwarding module is determined according to the following equations:

$$TP_q = R_q \times (1-PER_q), q=1,\ldots,N;$$

$$TP_{lo} = R_{lo} \times (1-PER_{lo})$$

where $TP_q$ represents a respective second uplink throughput of q-th second uplink forwarding module; $R_q$ represents a respective second data rate of q-th second uplink forwarding module; $PER_q$ represents a respective second packet error rate of q-th second uplink forwarding module; $TP_{lo}$ represents the local throughput; $R_{lo}$ represents the local data rate; and $PER_{lo}$ represents the local error rate; N and q are positive integers, q is between 1 and N.

21. The wireless extender of claim 14, wherein the processing unit compares the straight throughput and the at least one crossband throughput, selects a maximum throughput from the straight throughput and the at least one crossband throughput and determines the first uplink forwarding module having the maximum throughput or a second uplink forwarding module having the maximum throughput as a selected uplink forwarding module, and the determination unit determines to transmit the packet data received from the client device to the wireless access device and receive the packet data from the wireless access device for the client device via the selected uplink forwarding module.

22. The wireless extender of claim 12, wherein one of the communication quality indicators comprises at least one of a data rate, a packet error rate, a wireless link quality, received signal strength indication, a resend rate, transmit queued time, a signal to noise ratio.

* * * * *